United States Patent
Pasukonis

(10) Patent No.: US 11,067,406 B2
(45) Date of Patent: Jul. 20, 2021

(54) NAVIGATION METHOD USING HISTORICAL NAVIGATION DATA TO PROVIDE GEOGRAPHICAL- AND USER-OPTIMISED ROUTE SUGGESTIONS

(71) Applicant: Trafi Limited, London (GB)

(72) Inventor: Jurgis Pasukonis, London (GB)

(73) Assignee: TRAFI LIMITED, London (GB)

( * ) Notice: Subject to any disclaimer, the term of this patent is extended or adjusted under 35 U.S.C. 154(b) by 488 days.

(21) Appl. No.: 15/848,134

(22) Filed: Dec. 20, 2017

(65) Prior Publication Data

US 2019/0186938 A1 Jun. 20, 2019

(51) Int. Cl.
*G01C 21/34* (2006.01)

(52) U.S. Cl.
CPC ..... *G01C 21/3492* (2013.01); *G01C 21/3423* (2013.01); *G01C 21/3484* (2013.01)

(58) Field of Classification Search
CPC ............ G01C 21/3492; G01C 21/3423; G01C 21/3484
See application file for complete search history.

(56) References Cited

U.S. PATENT DOCUMENTS

| | | | |
|---|---|---|---|
| 2002/0120396 A1* | 8/2002 | Boies | G06Q 10/047 701/424 |
| 2010/0280748 A1* | 11/2010 | Mundinger | G01C 21/3423 701/532 |
| 2014/0249747 A1* | 9/2014 | Kosseifi | G01C 21/3492 701/428 |
| 2014/0372030 A1* | 12/2014 | Leader | G01C 21/20 701/526 |
| 2017/0219368 A1* | 8/2017 | Meredith | G01C 21/3484 |
| 2017/0328725 A1* | 11/2017 | Schlesinger | G01C 21/3484 |

* cited by examiner

*Primary Examiner* — Aaron L Troost

(74) *Attorney, Agent, or Firm* — Haynes and Boone, LLP

(57) ABSTRACT

The present invention includes methods and systems for calculating navigation routes, in particular by using historical navigation data from one or more users of the system to optimise the route calculation for a given geographical area, e.g. a city, and/or for an individual user. By updating the criteria used to determine optimal routes based on feedback from users, the calculated navigation routes are further improved.

20 Claims, 3 Drawing Sheets

NAVIGATION METHOD USING HISTORICAL NAVIGATION DATA TO PROVIDE GEOGRAPHICAL- AND USER-OPTIMISED ROUTE SUGGESTIONS

FIELD OF THE INVENTION

The present invention includes methods and systems for calculating navigation routes, in particular by using historical navigation data from one or more users of the system to optimise the route calculation for a given geographical area, e.g. a city, and/or for an individual user.

BACKGROUND

Existing navigation systems, for example Google Maps, Citymapper, can be used to generate one or more suggested routes between user-defined start and end locations. The routes are generated based on the local transport network topology and current network condition, e.g. traffic/congestion, bus frequency, delays or closures on the train network.

These existing systems present users with one or more route options depending on one or more modes of transport. In addition to the basic transport network topology of a given geographical area, i.e. bus routes, rail routes, interchanges, these systems can also include real-time transport data such as bus/metro/train times, network disruptions and estimates of taxi fares. However, these systems do not take other relevant local factors into account, for example residents of a particular city might wish to avoid walking due to high crime levels, or to avoid a particular metro station because it is known to be exceptionally busy. This additional local information is not generally available in a form that can be taken into account by navigation systems, e.g. via an API. Even if the information were available, it would add significant complexity to the existing route generation methods, and consequently it is not feasible to take all of these local factors into account when generating route.

Furthermore, these existing system have limited customisability for an individual user. Some options are available for routing requirements, such as toll avoidance, highway avoidance etc. but generally these are specified via check boxes in a user interface and have limited applicability to multi-modal transport, for example where a given user might prefer to walk more or might prefer to minimise interchanges as part of their journey, even if it is not the fastest route.

Consequently, there exists a need for improved methods for calculating navigation routes that can take the myriad local factors into account when generating routes in order to provide suggested routes that are optimised for a given city, or even for a given user.

SUMMARY OF THE INVENTION

According to a first aspect of the invention, a computer-implemented method for generating navigation routes is provided. The method comprises:

receiving a route request from an electronic device, the route request comprising a route start location and a route end location;

generating a plurality of candidate routes based on the route start location and route end location;

generating a metric for each candidate route, each metric comprising a set of route parameters;

retrieving one or more criteria, each criterion comprising a set of weightings based on historical navigation data, the weightings corresponding to the plurality of route parameters;

generating a plurality of scores for each candidate route by combining the metric for each route with each of the one or more criteria;

determining one or more optimal navigation routes for each criterion based on the generated scores; and providing the optimal routes to the electronic device.

The historical navigation data may comprise historical routes that have been taken in the geographical area containing the route start location and route end location and wherein the historical routes correspond to routes taken by a plurality of users.

The electronic device may be associated with a first user, and the historical navigation data may alternatively, or additionally, comprise historical routes taken by the first user.

Generating the plurality of candidate routes may comprise retrieving routing data from plurality of transport data providers based on the route start location and the route end location. The routing data may be used to generate a routing graph between the route start location and route end location in which nodes of the graph correspond to interchanges between two or more modes of transport and edges of the graph corresponding to available modes of transport between the nodes. A plurality of candidate routes through the routing graph may then be generated.

The routing data may comprise one or more of: public transport station or stop locations, next bus time, next train time, next metro time, transit time, frequency of public transport service, wait time, service status, cost, congestion status, and ride-sharing availability. The routing data is received in real-time and corresponds to current transport conditions, and the routing graph may be updated in real-time based on the routing data.

Generating the metric for each candidate route may comprise calculating the values of the route parameters based on the routing data. The route parameters may comprise one or more of: duration, walking time, number of interchanges, frequency of public transport service, number of bus trips, number of metro trips, number of train trips, number of ride hailing trips, duration on bus, duration on metro, duration on train, waiting time, price, current weather.

The metric may be a vector in which each element corresponds to a route parameter, and each criterion may be a vector in which each element corresponds to a route parameter weighting. The score for each criterion may then be generated by calculating the dot product of the metric and the criterion.

The optimal route for each criterion is the candidate route with the highest score, or the candidate route with the lowest score, depending on the way in which the route parameters and criteria weights are defined.

The optimal routes may be transmitted to the electronic device to be presented to a user.

The method may further comprise determining that one of the optimal navigation routes was chosen and generating updated historical navigation data based on the chosen route. Determining that one of the routes was chosen may include receiving an indication of a selected one of the optimal navigation routes from the electronic device.

Location-time data may also be received from the electronic device, and determining that one of the optimal navigation routes was chosen may additionally or alternatively comprise analysing the received location-time data to determine the route that was chosen.

Generating updated historical navigation data may comprise storing the metrics for the generated candidate routes and an indication of the chosen route. One or more updated criteria may be generated based on the updated historical navigation data. The generation of updated criteria may be carried out on a regular basis, or may be performed in response to generating updated historical navigation data.

Generating the updated criteria may comprise modifying the weighting values of each criterion to maximise the correlation between the selected route and relevant criterion, and may use a learning to rank approach.

The electronic device may be associated with a user account, and one or more of the criteria may be associated with the user account. Alternatively, or additionally, one or more of the criteria may be associated with a geographical area within which the route start location and route end location are located. The geographical area may be a city, town, village, country, state, county, or other administrative region.

The method may further comprise:

receiving a second route request from a second electronic device, the second route request comprising a second route start location and a second route end location;

generating a second plurality of candidate routes based on the second route start location and second route end location;

generating a metric for each candidate route;

evaluating the metric for each candidate route against the one or more updated criteria to determine one or more second optimal navigation routes for each updated criterion; and providing the second optimal routes to the electronic device.

The second route start location and second route end location may be within the same geographical area as the first route start location and first route end location.

The invention also includes a data-processing system comprising means for carrying out the method described above, a computer program product adapted to perform the method, and a computer-readable medium comprising the computer program product.

DETAILED DESCRIPTION OF THE INVENTION

Figure 1:
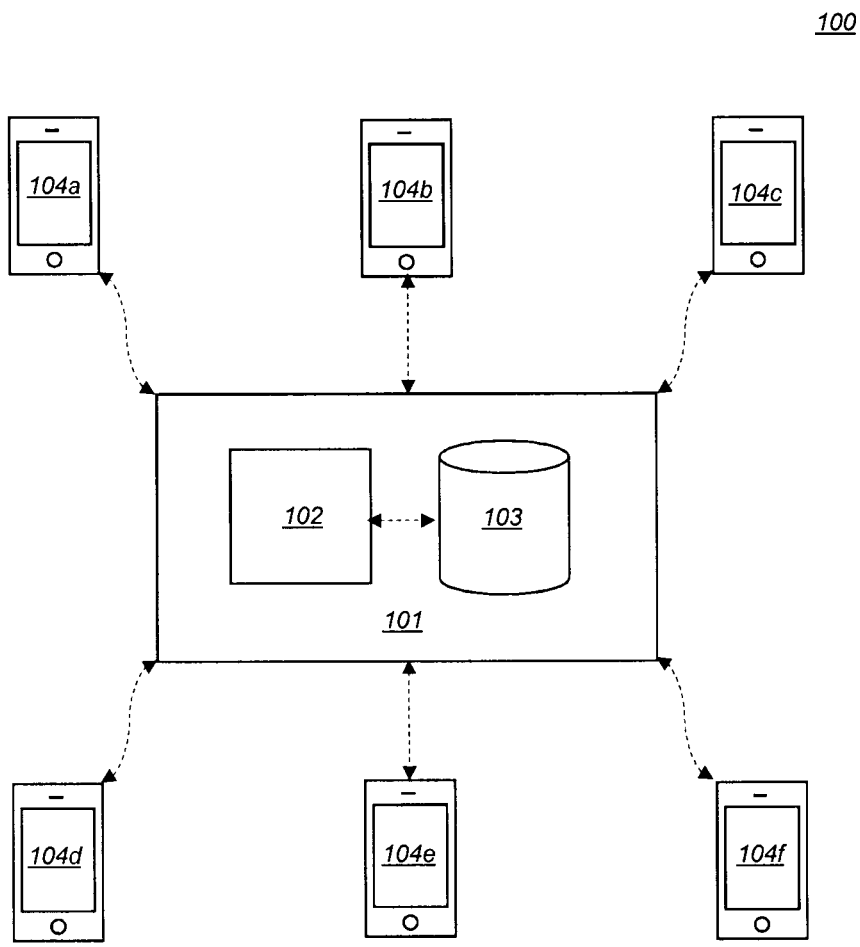
FIG. 1 depicts an exemplary system 100 for use with the method of the present invention.

FIG. 1 shows an exemplary system 100 for use with the method of generating navigation routes of the present invention. The system includes a server, 101, which has a processing unit 102 and storage 103, and several electronic devices 104a-f, which are typically user devices, operated by users of the system and method described herein. The server 101 is not necessarily a dedicated server, and may be any suitable computing device that is connected a wide area network, such as the internet. Each electronic device 104a-f may be a mobile/cellular phone, tablet, laptop PC, desktop PC, smartwatch, or any other electronic device capable of communication with the server via a wide area network, such as the internet. Preferably, the electronic devices also provide location tracking, for example using GNSS- and/or network-based location determination.

It will be appreciated that the methods described herein are generally carried out on the server 101, but are not necessarily carried out by a single device. Some tasks may be offloaded to one or more other servers, or even the electronic devices themselves, where appropriate. The methods may be implemented in software, and may be provided as a computer program on a carrier or computer readable medium.

Figure 2:
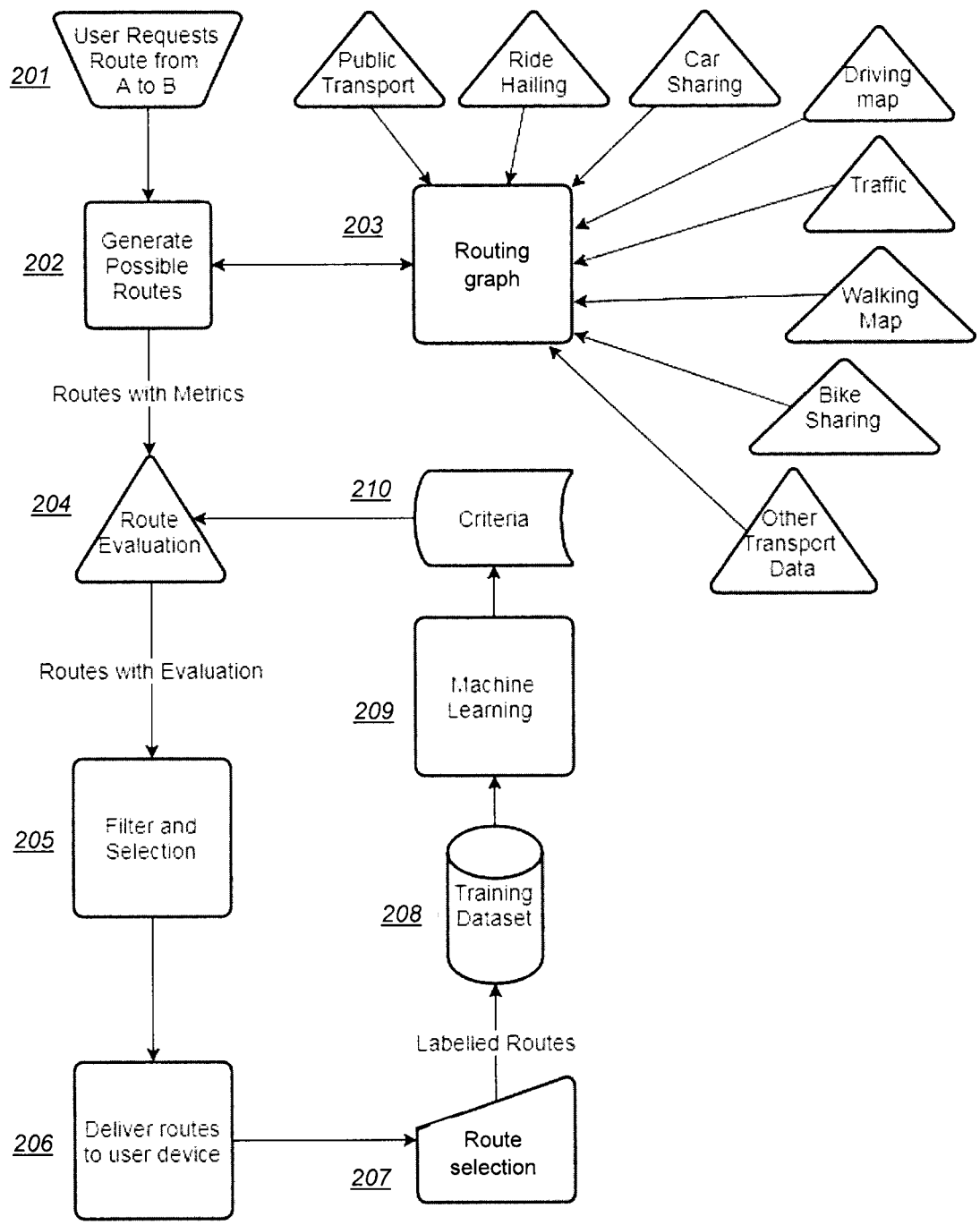
FIG. 2 depicts the process 200 of generating routes and using historical navigation data and selected routes to improve future generated routes.

FIG. 2 depicts a flow diagram, showing an end-to-end process for generating navigation routes, where a user requests a route, and candidate routes are generated, evaluated and presented to the user. The user selects one of the presented routes, which can be used to refine the criteria used to evaluate the route generated for subsequent routing requests.

Turning to the specific elements shown in FIG. 2, at block 201, a user transmits a route request, corresponding to a route between a route start location A and route end location B. The request may be generated by a mobile application, desktop application or web browser, running on an electronic device 104a-f. The request is transmitted over a network, such as the internet, and is received by the server 101, which is capable of generating a set of routes based on map, traffic and routing data for different transport modes such as walking, cycling, live public transport, ride hailing, car sharing, bike sharing, etc. Routes can include combinations of these different transport modes.

At block 202, in response to the request, the server 101 retrieves relevant routing information from a routing graph 203 to generate a plurality of candidate routes based on the route start and end locations.

The routing graph 203 describes the local transport infrastructure, such as roads, rail and metro lines and stations, bus routes and bus stops etc., to be used for generating routes between the route start location A and route end location B. Typically, the routing graph is made up of a number of nodes and edges, the nodes corresponding to transport interchanges (e.g. a metro station, train station, bus stop) and the edges corresponding to modes of transport between the nodes. The routing graph may also have access to systems providing up-to-date, real-time information for current transport conditions, such as traffic, bus times, train times, metro times, weather, wait time, costs, ride sharing availability etc. This means that fully up to date information can be used to generate a set of routes and to generate the metrics for each route.

For each candidate route, the server 101 also generates a metric that includes a set of parameters that describe characteristics of the route. An example of a metric for a route r, $\vec{M}(r)$, is $$\vec{M}(r) = \begin{Bmatrix} \text{Duration}(r), \text{Walktime}(r), \text{Transfers}(r), \\ \text{Frequency}(r), \text{BusTrips}(r), \text{MetroTrips}(r), \\ \text{RideHailTrips}(r), \text{Price}(r), \text{Other}(r) \end{Bmatrix}$$

It will be appreciated that a metric can include as many or few parameters as required, and that the metrics may be based on any of the data available in the routing graph alone or in combination with other data from the routing graph.

For example, the Duration(r) parameter depends on the cumulative total of the durations of each leg of the route, such as time spent walking plus time spent on a bus. The metric scores a route, r, for a wide range of factors such that when combined with user criteria a score for the route can be generated, as described with respect to block 204. In general, the or each parameter of the metric should be generated such that a lower value of the parameter indicates a more preferable route. For example, while a higher frequency of buses might be desirable, the Frequency(r) parameter should be constructed so that a lower value of the parameter is optimal, e.g. by using the period, i.e. 1/frequency, as the value of the parameter in the metric.

At block 204, the criteria 210 that are used to assess the candidate routes are retrieved from storage 103 and a score is generated for each of the candidate routes by combining the metric for each candidate route with the criteria. Each of the criteria 210 includes a set of weights that correspond to the route parameters of the metric, where a higher number for a given element denotes the relative importance of the element. For example, criteria for a recommended route $\vec{C}_{rec}$, a cheap route $\vec{C}_{cheap}$, and a fast route $\vec{C}_{fast}$ could be defined as follows:

$$\vec{C}_{rec}=(1,3,10,8,0.2,5,4,0.11)$$

$$\vec{C}_{cheap}=(1,3,10,8,0.2,5,4,1,1)$$

$$\vec{C}_{fast}=(5,3,10,8,0.2,5,4,0.1,1)$$

The criteria 210 are based on historical navigation data of one or more users as explained below with respect to blocks 207 to 209.

A score for each candidate route can be generated by the summing the products of each route parameter and its corresponding coefficient, i.e.

$$E(r,\vec{C}) = \vec{M}(r) \cdot \vec{C} = \sum_i M_i C_i$$

Where $M_i$ and $C_i$ are the $i^{th}$ element of M and C respectively, to give a number, E, that corresponds to the score. It will be appreciated that, in practice, it is not essential to the invention for vectors to be used to represent the metrics and the criteria or for the inner product of the metric and criteria vectors to be used to generate the score. Any suitable method for representing the metrics and criteria and calculating the score could be used, for example by representing the metrics and criteria as classes in an object-oriented programming language, and implementing a method to generate a score based on a metric object and a class object.

At block 205, the scores for each criterion and each candidate route are compared, so that the optimal navigation routes can be selected for sending to the electronic device. By evaluating each generated candidate route for each set of criteria using the above method, the system can then determine one or more optimal routes for each criterion by determining which of the candidate routes have the lowest scores E for the criterion. Depending on the specific conditions that the criteria encode, for example placing emphasis on a fast or cheap route, the system is able to recommend the fastest routes or cheapest routes to the user by providing the user with a pre-determined number of routes with the lowest scores for each criterion.

At block 206, the optimal navigation routes are then sent to the electronic device 104a-f. At block 207, the user indicates a selected one of the optimal navigation routes. The indication of the route selection may be by virtue of a user of the electronic device select one of the optimal navigation routes via a user interface (henceforth 'explicit selection'), or may be determined by reference to location data of the electronic device revealing the route that was actually taken (henceforth 'implicit indication'). However, in practice, explicit selection is usually received, so it is not necessary to rely on location data provided by the electronic device to identify a single route among the optimal routes that were provided to the electronic device. The location of the electronic device may only be provided to the server while a specific application—i.e. the application used to request and receive the routes—is running on the electronic device. While it is possible to enable the transmission of location data while the specific application is in the background, this option is not always reliable since many users disable background services to conserve battery life or for privacy reasons. Furthermore, the location of the device cannot always be reliable determined, such as in highly built-up areas where GNSS signals are unreliable, or when a portion of a route uses an underground metro service. Thus, preferably, the selected route is determined based on a combination of both the explicit selection of a route via a user interface of the electronic device, and the implicit indication via location data, which is used to verify that the selected route was in fact taken. Since the selected routes are used as training data to update the criteria (as described in more detail below), by increasing the accuracy of the training data in this way, the accuracy of the criteria is improved.

At block 208, the metrics for each of the optimal routes for each criterion are stored in the historical navigation data, along with an indication of which metric corresponds to the selected route. This historical navigation data is then used as a training data set for optimising the criteria.

At block 209, the server uses the historical navigation data to update the existing criteria, such that the routes that are similar to the selected route will produce a better score in future evaluations, as described in more detail below.

As mentioned above, the metrics for the optimal navigation routes can be used as a set of training data for creating and updating the criteria $\vec{C}$. Preferably, a pairwise learning to rank approach is used, as described in Burges et al, *Learning to Rank using Gradient Descent*, Proceedings of the 22nd International Conference on Machine Learning, 2005. In particular, Burges et al defines the cost function as:

$$C_{ij}=-\overline{P}_{ij}o_{ij}+\log(1+e^{o_{ij}})$$

in which $\overline{P}_{ij}$ is the target probability that route i will be ranked higher than route j, $o_{ij} \equiv f(x_i)-f(x_j)$, $\vec{x}_i$ corresponds to the metric for a route i, and $f(\vec{x}_i)$ is the score for the route. While Burges et al assumes that the function $f(\vec{x}_i)$ is approximated by a neural network, in the present invention, $f(\vec{x}_i|\vec{C})=\vec{x}_i \cdot \vec{C}$ is a linear assumption that corresponds to a single layer neural network. By minimising the cost function, the weights of the single layer of the neural network, i.e. the criteria weights, are optimised.

In general, the machine learning process of step 209 is carried out on a regular schedule, e.g. once a day, rather than every time a route is selected. Unless the quantity of incoming training data is sufficiently large, training in batches produces better results and is more stable than so-called "online" training after each data point.

At block 210, the updated criteria are then stored for use in the next request.

If the historical navigation data relates to a single user, then the machine learning process will cause the criteria to converge on the user's preferences. Consequently, the optimal routes that are provided to that user will be more relevant to the user and will adapt to that user's preferred ways of travelling, e.g. by avoiding buses, or preferring to take a cheaper route rather than a faster route.

If the historical navigation data used to train the criteria is generated by multiple users' selected routes within a common geographical area as a training set, then system/method will produce criteria specific to that geographical area. This criteria essentially encodes local factors that are not and often cannot be accounted for in conventional routing system, i.e. by providing the information as part of the routing graph and using a pre-programmed approach to take that information into account when generating routes. This enables the method/system to adapt to different cities where different factors may be important. For example, in one metro system may be stretched to capacity and uncomfortably busy, so travellers in that city may prefer to avoid taking the metro. In another city, the metro may not suffer the same issues, and so may be a preferred mode of transport. Importantly, the present method also allows the criteria to adapt to changing conditions. If the first city's metro network is updated or expanded and becomes less busy, then people may begin to use it more frequently, which will result in the criteria for that city changing over time to de-emphasise avoiding the metro.

The criteria that are generated for a given geographical area can also be provided to new users in a geographical area as their initial criteria, which will enable the new user to take advantage of local knowledge about which transport options are preferable, and which less so, based on information that is not and cannot be provided via the real-time network graph. Subsequently, these criteria can be updated based on the specific user's historical navigation data only to provide a layer of personalisation on top of the optimal route for the geographical area.

As a user adds more feedback data from more usage of the routing system, the machine learning process could instead be used to optimise the criteria for agreement between the routes offered and the user's feedback, which is therefore a method of generating personalised routing criteria. Given that this will initially start with a small amount of data, and that a user's requirements may evolve over time, this could be applied either via the simpler method of simply replacing the coefficients in the current $\vec{C}_{rec}$, or it could be a small modification of $\vec{C}_{rec}$ in the direction that would improve the agreement e.g.

$$\vec{C}_{updated} = (1-\|)\vec{C}_{old} + \lambda \vec{C}_{new}$$

Where is a learning rate parameter, $\vec{C}_{old}$ is the previous best fit criteria and $\vec{C}_{new}$ is the new best fit criteria. This way route requirements gradually change and can avoid being disrupted if the most recent data doesn't fit in with typical usage patterns. It will also cause the routes selected to change more gradually, which may be preferable for the user.

Figure 3:
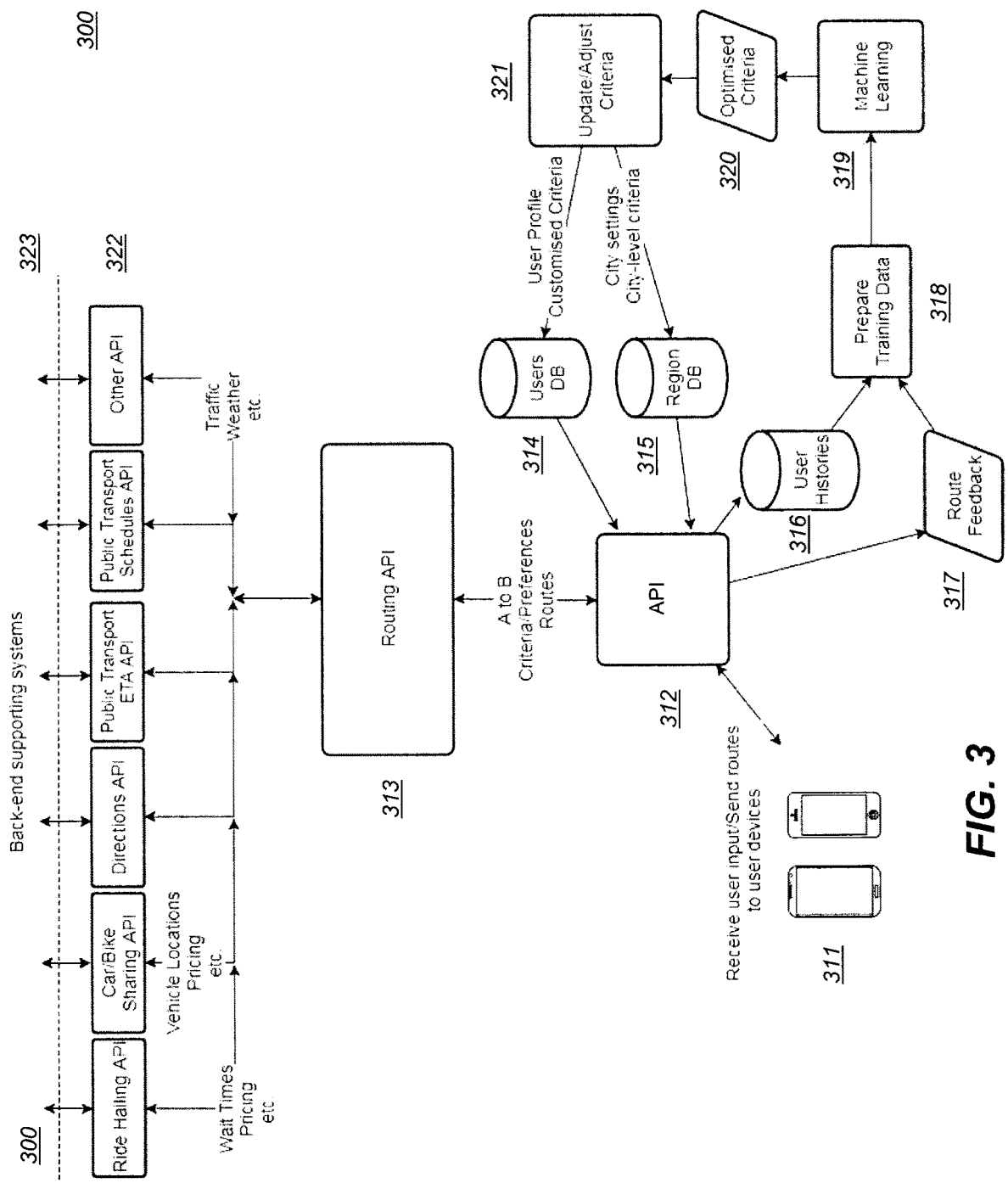
FIG. 3 depicts a further exemplary system 300 for use with the method of the present invention.

Referring now to FIG. 3, a specific example of a system for generating routes and delivering them to the electronic devices is shown. The system can make use of existing platforms to consolidate routing possibilities using a number of transport modes. This allows the system to implement a broad range of routing options into a multimodal routing platform.

The electronic device 311 generates a routing request which is forwarded to the core system API 312, in this case this is the API. The API can access a routing API 313, plus the databases of criteria sets for individual users 314 and geographical areas, such as cities, 315. As mentioned above, the electronic device can be either an application on e.g. a mobile device, a web browser interface, or another interface. The API 312 can then look up the relevant criteria from the databases 314, 315, such and pass them to the routing API (313).

The routing API 313, maintains the routing graph 203 described above. The routing API is responsible for retrieving the real-time data on transport conditions, such as waiting times for ride hailing in the region, car sharing positions, public transport ETA and timetables, traffic, walk times, etc, and using this data to update the routing graph. The routing API 313 is also responsible for generating the candidate routes (around 100 in a typical implementation) for evaluation.

The routing system 313 may also calculate the metric $\vec{M}(r)$ for each route r so that the routes can be compared. The metrics are then evaluated using the retrieved criteria such that the routes can be compared and one or more optimal routes for each criterion can be found. The optimal routes per criteria set is then sent to the API 312, and on to the electronic device 311 where they are then presented to the user.

Upon the routes being presented to the user, the user can then respond by selecting one of the routes to use for navigation and/or navigating along a route, as explained above. The user's selection is then sent back to the API (312), where the metrics for the optimal routes and selected routes are stored as historical navigation data in the User History DB 316, along with the indication of the selected routes 317 for preparing training data 318 for the machine learning system 319.

The machine learning system 319 can then use this training data 318 to create optimised criteria 320, which can then be used to update existing criteria 321 to better fit the user data, before this updated criteria is sent to the relevant database 314, 315, as explained above.

A use-case example involving a user is as follows: User 1 requests a route from A to B (a train station to a museum) using an app accessing the system described herein. As this is the user's first time using the system, they are recommended a set of routes based on the best fit criteria to users' route histories in that region. The user selects the route which has the lowest cost, even though it is a slightly longer in duration than other options, and involves walking a larger portion of the route. The user continues to make use of the app for navigating in the city, and by virtue of having selected the route, and/or by continuing to transmit location data matching one or more points along the route populates a user history showing this preference for lower cost transport, and a willingness to walk as one of the modes of transport even if it means journeys take slightly longer. The system shifts the user's criteria through the machine learning algorithm, in order to optimise their route offerings with the types of routes chosen with each usage. At a later date, with these preferences reflected in the user's personalised criteria, suppose this same user wishes to travel between the same points (i.e. A to B) as their original journey with the app. Now, the system offers a different set of routes from the first use, these being focussed on low cost and walking options, due to these new criteria for the user causing the evaluation stage to give the more expensive routes lower scores. The user is able to choose between more lower cost options than were presented previously, albeit with a longer walk distance and longer journey time.

A use-case example involving a different user is as follows: User 2 requests a route from C to D (a hotel to an office building) using an app accessing the system described herein. As this is the user's first time using the system, they are recommended a set of routes based on the best fit criteria to users' route histories in that region. The user is presented with multiple different route options. The user selects the route which has the shortest journey time and fewest changes, even though it specifies a large distance using a ride hailing service which is much more expensive than the local public transport. The user continues to make use of the app for navigating in the city, and by virtue of having selected the route, and/or by continuing to transmit location data matching one or more points along the route populates a user history showing this preference for faster transport with fewer changeovers, with little to no preference for reduced-cost transport modes. The system shifts the user's criteria via the machine learning algorithm, in order to optimise their route offerings with the types of routes chosen with each usage. At a later date, with these preferences reflected in the user's personalised criteria, suppose this same user wishes to travel between the same points (i.e. C to D) as their original journey with the app. Now, the system offers a different set of routes from the first use, these being focussed on speed with little concern for cost, due to these new criteria for the user causing the evaluation stage to give these alternative cheaper/longer routes lower scores. The user is able to choose between more faster, more expensive, options than before due to their historic data.

Whilst the present invention is primarily directed towards city-based navigation systems, it is possible that it can be applied in rural or inter-city applications. This could open the possibility of using the routing method for e.g. flight itinerary searches for user-preferences-optimised flight plans, which is of particular benefit to long haul passengers who will likely have to change flights at some point. This could also be applied to e.g. intercity travel where users may have to take multiple trains/coaches etc. The machine learning aspects could be extended to provide further elements of customisation, or which modes of transport are listed as possibilities.

The ability to customise routes depending on which combination of transport modes are used and details of the transfers could be used to provide usage-based navigation profiles for specific categories of users who may have more complex transportation needs, such as disabled users.

There are many possibilities in this system to implement variations while still using the core concepts and processes described. Options include which feedback model is used to generate user data. The simplest possible model is implicit feedback, where the only factor employed is which route a user selected/used. More complex variations could incorporate a like/dislike option on routes for users to more directly provide feedback on their routing preferences The number of criteria that are generated could be varied. For a given routing request, it is possible to generate many different sets of criteria, each optimised for a given purpose e.g. global average criteria, regional average criteria, faster routing criteria, cheaper routing criteria etc. Which of these, and what combination of these are used to generate the best route for each set, is an optional variation. How many routes to offer per query and/or criteria set could also vary, depending on how much information is preferred per user query.

Which modes of transport to include in a given request, and exactly what information is returned, is variable depending on which APIs the system can exchange information with, as well as what information they can provide that will determine what live data is available.

How to update the criteria is a variable, in that criteria may "evolve" slowly via a learning parameter, or new best fit criteria may simply replace those that were in the system before. Pre-caching of some/all the data may be desirable on mobile devices, so that the system can be used offline.

In conclusion, by taking historical navigation data corresponding the routes actually taken by one or more users into account when generating new routes, the present invention is able to provide improved route suggestions, and provide suggestions for routes within a given geographical area based on local factors that cannot otherwise be taken into account. Furthermore, by continuing to update the criteria as a user uses the system and selects routes, the suggested routes can be further tailored towards an individual user's requirements.

The following is a numbered list of embodiments that may or may not be claimed:

1. A computer-implemented method for generating navigation routes, the method comprising:
a. receiving a route request from an electronic device, the route request comprising a route start location and a route end location;
  generating a plurality of candidate routes based on the route start location and route end location;
b. generating a metric for each candidate route, each metric comprising a set of route parameters;
c. retrieving one or more criteria, each criterion comprising a set of weightings based on historical navigation data, the weightings corresponding to the plurality of route parameters;
d. generating a plurality of scores for each candidate route by combining the metric for each route with each of the one or more criteria;
e. determining one or more optimal navigation routes for each criterion based on the generated scores; and
f. providing the optimal routes to the electronic device.

2. The computer-implemented method of embodiment 1, wherein the historical navigation data comprises historical routes that have been taken in the geographical area containing the route start location and route end location and wherein the historical routes correspond to routes taken by a plurality of users.

3. The computer-implemented method of embodiment 1 or embodiment 2, wherein the electronic device is associated with a first user, and the historical navigation data comprises historical routes taken by the first user.

4. The computer-implemented method of any preceding embodiment, wherein generating the plurality of candidate routes comprises retrieving routing data from a plurality of transport data providers based on the route start location and the route end location.

5. The computer-implemented method of embodiment 4, wherein generating the plurality of candidate routes further comprises:
  a. generating a routing graph, based on the routing data, between the route start location and the route end location in which nodes of the graph correspond to interchanges between two or more modes of transport and edges of the graph corresponding to available modes of transport between the nodes; and b. generating a plurality of candidate routes through the graph.

6. The computer-implemented method of embodiment 5, wherein the routing data comprises one or more of: public transport station or stop locations, next bus time, next train time, next metro time, transit time, frequency of public transport service, wait time, service status, cost, congestion status, and ride-sharing availability.

7. The computer-implemented method of embodiment 6, wherein the routing data is received in real-time and corresponds to current transport conditions.

8. The computer-implemented method of embodiment 7, wherein the routing graph is updated in real-time based on the routing data.

9. The computer-implemented method of any once of embodiments 4 to 8, wherein generating the metric for each candidate route comprises calculating the values of the route parameters based on the routing data.

10. The computer-implemented method of embodiment 9, wherein the route parameters comprise one or more of: duration, walking time, number of interchanges, frequency of public transport service, number of bus trips, number of metro trips, number of train trips, number of ride hailing trips, duration on bus, duration on metro, duration on train, waiting time, price, current weather.

11. The computer-implemented method of any preceding embodiment, wherein the metric is a vector in which each element corresponds to a route parameter, wherein each criterion is a vector in which each element corresponds to a route parameter weighting, and wherein the score for each criterion is generated by calculating the dot product of the metric and the criterion.

11. The computer-implemented method of embodiment 11, wherein the optimal route for each criterion is the candidate route with the highest score.

12. The computer-implemented method of embodiment 11, wherein the optimal route for each criterion is the candidate route with the lowest score.

13. The computer-implemented method of any preceding embodiment, wherein the optimal routes are transmitted to the electronic device to be presented to a user.

14. The computer-implemented method of any preceding embodiment, further comprising:
  a. determining that one of the optimal navigation routes was chosen; and
  b. generating updated historical navigation data based on the chosen route.

15. The computer-implemented method of embodiment 15, the method further comprising receiving an indication of a selected one of the optimal navigation routes from the electronic device.

16. The computer-implemented method of embodiment 15 or 16, the method further comprising receiving location-time data from the electronic device.

17. The computer-implemented method of embodiment 17, wherein determining that one of the optimal navigation routes was chosen comprises analysing the received location-time data to determine the route that was chosen.

18. The computer-implemented method of any one of embodiments 15 to 18, wherein generating updated historical navigation data comprises storing the metrics for the generated candidate routes and an indication of the chosen route.

19. The computer-implemented method of embodiment 19, further comprising generating one or more updated criteria based on the updated historical navigation data.

20. The computer-implemented method of embodiment 20, wherein generating the one or more updated criteria is carried out on a regular basis.

21. The computer-implemented method of embodiment 20, wherein generating the one or more updated criteria is performed in response to generating updated historical navigation data.

22. The computer-implemented method of any one of embodiments 20 to 22, wherein generating the one or more updated criteria comprises modifying the weighting values of each criterion to maximise the correlation between the selected route and relevant criterion.

23. The computer-implemented method any one of embodiments 20 to 23, wherein the electronic device is associated with a user account, and wherein one or more of the criteria are associated with the user account.

24. The computer-implemented method of any one of embodiments 20 to 24, wherein one or more of the criteria are associated with a geographical area within which the route start location and route end location are located.

25. The computer-implemented method of embodiment 25, wherein the geographical area is a city, town, village, country, state, county, or other administrative region.

26. The method of any one of embodiments 20 to 26, the method further comprising:
  a. receiving a second route request from a second electronic device, the second route request comprising a second route start location and a second route end location;
  b. generating a second plurality of candidate routes based on the second route start location and second route end location;
  c. generating the metric for each candidate route;
  d. evaluating the metric for each candidate route against the one or more updated criteria to determine one or more second optimal navigation routes for each updated criterion; and
  e. providing the second optimal routes to the electronic device.

27. The computer-implemented method of embodiment 27, wherein the second route start location and second route end location are within the same geographical area as the first route start location and first route end location.

28. A data-processing system comprising means for carrying out the method of any preceding embodiment.

29. A computer program product adapted to perform the method of any one of embodiments 1 to 28.

30. A computer-readable medium comprising the computer program product of embodiment 30.

The invention claimed is:

1. A computer-implemented method for generating navigation routes, the method comprising:
  receiving a first route request from a first electronic device, the first route request comprising a first route start location and a first route end location;
  generating a first plurality of candidate routes based on the first route start location and the first route end location;
  generating a metric for a first candidate route of the first plurality of candidate routes, the metric comprising a set of route parameters;
  retrieving, from a neural network comprising neural network weights, one or more criteria, a criterion in the one or more criteria comprising a set of criteria weightings based on historical navigation data, the set of criteria weightings corresponding to the set of route parameters, wherein the historical navigation data comprises historical routes previously taken in a geographical area containing the first route start location and the first route end location by a plurality of users;

generating a plurality of scores for the first candidate route by combining the metric for the first candidate route with the one or more criteria;

determining one or more optimal navigation routes for the criterion in the one or more criteria based on the generated scores;

providing the one or more optimal navigation routes to the first electronic device; and training, using one or more metrics for the one or more optimal navigation routes and a cost function, the neural network weights of the neural network at predefined intervals, wherein the training minimizes the cost function at the neural network weights in a layer of the neural network, and wherein subsequent to training the neural network generates updated one or more criteria.

2. The computer-implemented method of claim 1, wherein the first electronic device is associated with a first user, and the historical navigation data comprises historical routes taken by the first user.

3. The computer-implemented method of claim 1, wherein generating the plurality of candidate routes comprises retrieving routing data from a plurality of transport data providers based on the route start location and the route end location, and wherein generating the metric for each candidate route comprises calculating the values of the route parameters based on the routing data.

4. The computer-implemented method of claim 3, wherein generating the plurality of candidate routes further comprises:

generating a routing graph, based on the routing data, between the route start location and the route end location in which nodes of the graph correspond to interchanges between two or more modes of transport and edges of the graph corresponding to available modes of transport between the nodes; and generating a plurality of candidate routes through the graph.

5. The computer-implemented method of claim 4, wherein the routing data comprises one or more of: public transport station or stop locations, next bus time, next train time, next metro time, transit time, frequency of public transport service, wait time, service status, cost, congestion status, and ride-sharing availability.

6. The computer-implemented method of claim 3, wherein the route parameters comprise one or more of: duration, walking time, number of interchanges, frequency of public transport service, number of bus trips, number of metro trips, number of train trips, number of ride hailing trips, duration on bus, duration on metro, duration on train, waiting time, price, current weather.

7. The computer-implemented method of claim 1, further comprising:

determining that one of the one or more optimal navigation routes was chosen; and generating updated historical navigation data based on the chosen route.

8. The computer-implemented method of claim 7, the method further comprising receiving an indication of the chosen one of the optimal navigation routes from the first electronic device.

9. The computer-implemented method of claim 7, the method further comprising receiving location-time data from the first electronic device.

10. The computer-implemented method of claim 9, wherein the determining that one of the optimal navigation routes was chosen comprises analysing the received location-time data to determine the one of the optimal navigation routes that was chosen.

11. The computer-implemented method of claim 7, wherein the generating updated historical navigation data comprises storing the metric generated for the first candidate route and an indication of the chosen route.

12. The computer-implemented method of claim 11, wherein the one or more updated criteria are generated based on the updated historical navigation data.

13. The computer-implemented method of claim 12, wherein one or more of the criteria are associated with the geographical area within which the first route start location and the first route end location are located.

14. The computer-implemented method of claim 13, wherein the geographical area is a city, town, village, country, state, county, or other administrative region.

15. The method of claim 12, further comprising:

receiving a second route request from a second electronic device, the second route request comprising a second route start location and a second route end location;

generating a second plurality of candidate routes based on the second route start location and second route end location;

generating a second metric for a second candidate route of the second plurality of candidate routes;

evaluating the second metric for the second candidate route against the one or more updated criteria to determine one or more second optimal navigation routes for each updated criterion; and providing the one or more second optimal navigation routes to the second electronic device.

16. The computer-implemented method of claim 15, wherein the second route start location and second route end location are within the same geographical area as the first route start location and first route end location.

17. A data-processing system comprising means for carrying out the method of claim 1.

18. A computer program product having a non-transitory computer-readable medium recording computer program logic configured to perform operations, the operating comprising:

receiving a first route request from a first electronic device, the first route request comprising a first route start location and a first route end location;

generating a first plurality of candidate routes based on the first route start location and the first route end location;

generating a metric for a first candidate route of the first plurality of candidate routes, the metric comprising a set of route parameters;

retrieving, from a neural network comprising neural network weights, one or more criteria, a criterion in the one or more criteria comprising a set of criteria weightings based on historical navigation data, the set of criteria weightings corresponding to the set of route parameters, wherein the historical navigation data comprises historical routes previously taken in a geographical area containing the first route start location and the first route end location by a plurality of users;

generating a plurality of scores for the first candidate route by combining the metric for the first candidate route with the one or more criteria;

determining one or more optimal navigation routes for the criterion in the one or more criteria based on the generated scores;

providing the one or more optimal navigation routes to the first electronic device; and training, using one or more metrics for the one or more optimal navigation routes and a cost function, the neural network weights of the neural network at predefined intervals, wherein the training minimizes the cost function at the neural network weights of the neural network, and wherein subsequent to training the neural network generates updated one or more criteria.

19. The computer program product of claim 18, wherein the computer program logic is further configured to perform operations comprising:

determining that one of the one or more optimal navigation routes was chosen; and generating updated historical navigation data based on the chosen route.

20. The computer program product of claim 19, wherein the computer program logic is further configured to perform operations comprising:

receiving location-time data from the first electronic device; and wherein the determining that the one of the optimal navigation routes was chosen further comprises analysing the received location-time data.

* * * * *